United States Patent [19]

Lauer

[11] Patent Number: 5,360,048
[45] Date of Patent: Nov. 1, 1994

[54] SURFACE COATED, EASILY MOUNTABLE CUSHIONING MEMBER AND METHOD OF MANUFACTURE

[75] Inventor: Eduardo Lauer, Zebulon, N.C.

[73] Assignee: NMC of North America, Inc., Zebulon, N.C.

[21] Appl. No.: 67,587

[22] Filed: May 27, 1993

[51] Int. Cl.$^5$ ............................................. B32B 31/26
[52] U.S. Cl. ..................................... 156/86; 156/497; 156/499
[58] Field of Search ................... 156/84, 85, 86, 497, 156/499

[56] References Cited

U.S. PATENT DOCUMENTS

| | | | |
|---|---|---|---|
| 1,934,047 | 11/1933 | Desnoyers et al. | 156/86 |
| 3,223,571 | 12/1965 | Straughan . | |
| 3,426,118 | 2/1969 | Chapman et al. | 156/86 |
| 3,426,119 | 2/1969 | Chapman et al. | 156/86 |
| 3,481,805 | 12/1969 | Holmes et al. | 156/86 |
| 3,607,496 | 9/1971 | Kissell . | |
| 3,813,272 | 5/1974 | Straughan . | |
| 3,832,260 | 8/1974 | Straughan . | |
| 4,634,615 | 1/1987 | Versteegh et al. . | |
| 4,776,803 | 12/1973 | Kissell . | |
| 4,780,158 | 10/1988 | Thomas . | |
| 4,861,412 | 8/1989 | Meister | 156/499 |
| 4,950,352 | 8/1990 | Greller | 156/497 |

*Primary Examiner*—Caleb Weston
*Attorney, Agent, or Firm*—Melvin I. Stoltz

[57] ABSTRACT

By providing a pre-formed compressible substrate with an intimately bonded thin film layer integrally affixed thereto in surrounding protecting relationship, a surface coated cushioning member for mounting to otherwise hard-surfaced products is realized. In the preferred embodiment, the surface coated cushioning member of the present invention is formed from foamed thermoplastic, elastomeric or rubber polymers or copolymers and are constructed with an elongated hollow cylindrical shape for peripherally surrounding and protecting products manufactured from elongated tubes, pipes, conduits, and the like. In addition to the product achieved, the present invention also includes a unique process for manufacturing the surface coated cushioning member and systems employed in accordance with the preferred process.

3 Claims, 2 Drawing Sheets

SURFACE COATED, EASILY MOUNTABLE CUSHIONING MEMBER AND METHOD OF MANUFACTURE

TECHNICAL FIELD

This invention relates to elongated, thermoplastic or elastomeric members which are peripherally surrounded and enclosed by a protective layer of plastic film material and methods for manufacturing such surface coated elongated, thermoplastic or elastomeric members.

BACKGROUND ART

During the last several years, increasing attention has been paid to improving the safety of products having a high probability of causing injury to individuals by unwanted or unexpected contact. In particular, metal frames of products and support structures used by children, the elderly, the injured or infirm have been manufactured with padding or cushioning protection in order to reduce or eliminate the severity of injury that could result by contact with an individual.

Examples of such products are found in amusement parks and playgrounds and include slides, swing sets, moving vehicles, etc. In order to eliminate or reduce injuries, these products are now either manufactured with or retrofitted with padding or thermoplastic or elastomeric foam material to provide a soft, cushioned outer surface to otherwise hard surfaces or structures. In addition to the products detailed above, numerous other products such as race cars, baby furniture, bicycles, hospital beds, support posts for basketball, volleyball, and the like, gym equipment, boat fenders, etc. have all been manufactured with padding or thermoplastic or elastomeric foam constructions for added protection.

In addition, numerous products are manufactured with padded or cushioned outer surfaces for decorative purposes. These products include show booth displays, window displays, and the like. Furthermore, cushioned products have also been commonly employed for insulating purposes, in order to conserve energy and reduce unwanted heat loss through various sources, such as hot water pipes which are exposed to substantially lower ambient temperatures.

In attempting to meet the demands for the products detailed above, foamed thermoplastic and/or elastomeric materials, such as polyethylene, have been accepted as the principal materials for meeting most product requirements. This acceptance has been caused by the ability of foamed thermoplastic and elastomerics to be formed in numerous sizes, shapes, and configurations. As a result, virtually any product can be effectively and efficiently improved by having the surface thereof covered by a soft, cushioning member.

Although the products to be enhanced by incorporating an outer cushioned surface comprise a wide variety of sizes and shapes, elongated, cylindrically-shaped tubes typify the principal market for cushioned surfaces. Since elongated cylindrical tubes are used to manufacture posts, slides, railings, water pipes, swing sets, etc., it is readily apparent that such tube members form the principal market area wherein cushioning is desired.

As a result, elongated, longitudinally extending thermoplastic or elastomeric tubes formed from polyethylene foam material have been widely accepted and employed on numerous products for providing the desired soft, compressible, injury reducing surface thereto. In addition, it has been found that these products have been unable to meet most of the demands imposed thereon.

One particular significant drawback that has occurred in these prior art uses, which has been incapable of being satisfactorily resolved, is the inability of these prior art elongated, thermoplastic or elastomeric tubes to withstand repeated abrasion, use, or contact. In general, although these prior art products do provide the desired soft, cushioning surface being sought, these prior art products are continuously receiving repeated contacting use in their installed position, and quickly degrade due to such use.

Prior art foam tubes are typically employed peripherally surrounding and protecting the hard outer surface of playground equipment found in retail outlets, such as food chains, as well as in swing sets employed at home. In order to protect the children playing on this equipment, the supporting frames and exposed metal surfaces are protected with thermoplastic or elastomeric cushioning means. However, during normal play, the children use this equipment continuously, kicking, rubbing, cutting, pulling, and tearing at the thermoplastic foam surfaces, causing such surfaces to be quickly degraded.

Another problem encountered in prior art installations is the inability of the thermoplastic or elastomeric components to withstand exposure to dirt, ink from pens, or exposure to pencils, crayons, and the like. As a result, in a relatively short time period, newly installed thermoplastic or elastomeric foam members become visually unappealing and unattractive.

In order to overcome these drawbacks, some prior art systems have attempted to peripherally envelope the thermoplastic or elastomeric foam tubes or members with a self-locking or self-sealing protective layer or sheet. Although the installation of such protecting sheets or layers have extended the life of the underlying thermoplastic or elastomeric tubes or members, the protecting sheets or layers are typically easily pried open by the activities of the users and stripped from their surrounding position. As a result, the surfaces of the underlying thermoplastic or elastomeric members is quickly exposed to physical contact and surface degradation.

Therefore, it is a principal object of the present invention to provide a thermoplastic or elastomeric tube or member incorporating an integral, protective, outer surface coating for substantially eliminating surface degradation during use.

Another object of the present invention is to provide a surface coated thermoplastic or elastomeric tube or member having the characteristic features described above which is capable of being easily and quickly installed on any desired product, to provide a soft, cushioned protecting surface thereto, while also substantially eliminating product degradation or discoloration during normal use.

Another object of the present invention is to provide a surface coated thermoplastic or elastomeric tube or member having the characteristic features described above which is inherently scratch resistant and is capable of being easily cleaned, providing substantially increased product longevity and visual appeal.

A further object of the present invention is to provide a surface coated thermoplastic or elastomeric tube or member having the characteristic features described above which is capable of being produced in virtually any desired color as well as with any desired surface configuration or texture.

Another object of the present invention is to provide a surface coated thermoplastic or elastomeric tube or member having the characteristic features described above wherein the surface coating is integrally bonded to the underlying thermoplastic or elastomeric material, virtually preventing any unwanted peeling therefrom.

Another object of the present invention is to provide a surface coated thermoplastic or elastomeric tube or member having the characteristic features described above which is substantially water impermeable while also imparting substantially increased resistance to degradation by chemical contact.

Another object of the present invention is to provide a manufacturing process for easily constructing a surface coated thermoplastic and elastomeric tube or member having the characteristic features described above which process is attainable with substantially reduced effort and cost.

Other and more specific objects will in part be obvious and will in part appear hereinafter.

SUMMARY OF THE INVENTION

By employing the present invention, the difficulties and limitations found in the prior art are substantially eliminated and an effective, useful, easily installed surface coated thermoplastic or elastomeric member is attained, providing an outer, cushioned protective layer to virtually any desired surface or structural member, with the thermoplastic or elastomeric member incorporating an abrasion resistant and dirt resistant surface coating integrally bonded thereto. In this way, virtually all of the problems previously encountered with prior art structures are eliminated and a highly effective and aesthetically pleasing construction is realized.

In accordance with the present invention, the surface coated thermoplastic or elastomeric member comprises a thin film which is integrally bonded to the outer surface of the thermoplastic or elastomeric substrate. In this way, the film forms the outer exposed surface of the thermoplastic or elastomeric member, providing a protective outer coating or layer which is capable of withstanding abrasion, as well as grease, ink, dirt, chemical, and environmental contamination or discoloration.

In accordance with the present invention, the surface coated member comprises an underlying substrate formed of a thermoplastic polymer, an elastomeric polymer, a copolymer, or mixture thereof. In addition, the substrate comprises a continuous film forming the outer surface thereof, with said film being integrally bonded, laminated, or melted into the outer surface of the substrate. By employing this construction, the resulting product possesses the inherent qualities required for attaining long-term use and abrasion resistance.

In most applications, the thermoplastic polymer, elastomeric polymer, copolymer, or mixture thereof meeting the requirements for the present invention are typically constructed from materials which are foamed, whether such foam substrate comprises open cells or closed cells. In general, the substrate manufactured in accordance with the present invention comprises a density ranging between about 1 and 500 kg/m$^3$.

Depending upon the application to which the substrate is to be employed, the substrate can be formed in any desired size or shape, as well as in virtually any desired configuration, including both hollow and solid members. Furthermore, virtually any desired film thickness can be employed to surround and protect the substrate. However, it has been found that the protective film layer should comprise a thickness ranging between about 0.0005 and 0.040 inches.

In addition to providing the film coated cushioning product detailed above, the present invention also comprises a method for manufacturing this product. In accordance with the present invention, an easily executed, inexpensive, efficient process is attained for applying a protective film to the outer surface of the pre-formed foam substrate. As taught herein, a heat shrinkable film is peripherally surrounded about the foam substrate and heated to its melting temperature, causing the film to shrink into secure, intimate, bonded interengagement with the surface of the substrate. In this way, secure, intimate, bonded affixation of the film to the foam substrate is attained.

In the preferred embodiment, the film is heated by employing heated air, the temperature of which has been elevated to the necessary temperature for achieving the desired film melting. In addition to raising the temperature of the film to the desired level, the use of hot air also forces the film into abutting, contacting, interengagement with the foam substrate, thereby further enhancing and assuring intimate bonded, affixed, interengagement of the film to the foam member.

In addition to using heated air, mechanical pressure rollers are preferably employed, in order to further provide secure affixation of the film to the foam substrate. By employing rollers which physically contact the outer surface of the film and force the film into abutting interengagement with the foam substrate, the desired bonded interengagement of the film and foam is achieved and air pockets, which might otherwise occur, are avoided.

The invention accordingly comprises the several steps and the relation of one or more of such steps with respect to each of the others and the article produced possessing the features, properties and the relation of elements, which are exemplified in the following detailed disclosure and the scope of the invention will be indicated in the claims.

THE FIGURES

For a fuller understanding of the nature and objects of the invention, reference should be had to the following detailed description taken in connection with the accompanying drawings, in which:

FIG. 1 is a perspective view of one embodiment of an elongated, surface coated cushioning member in accordance with the present invention, manufactured in an elongated hollow cylindrical shape; and FIGS. 2-5 are plan views depicting alternate embodiments of the equipment employable in manufacturing the elongated cylindrically shaped surface coated member of FIG. 1 in accordance with the process of the present invention.

DETAILED DESCRIPTION

Figure 1:
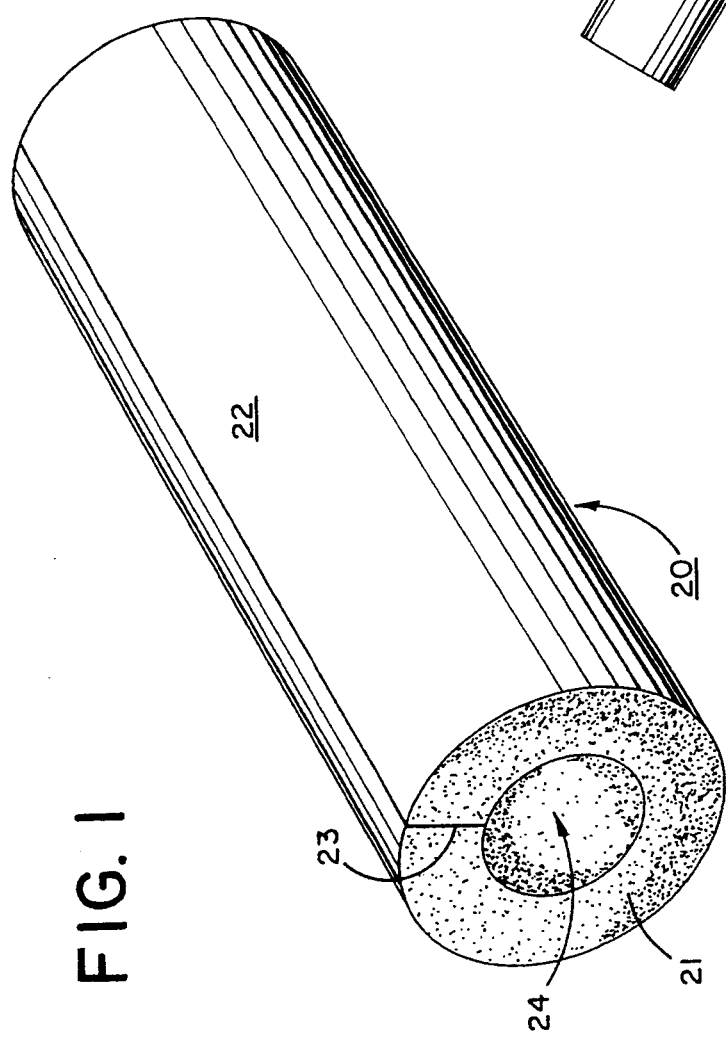

In FIG. 1, the present invention is depicted as a surface coated elongated member 20, which comprises thermoplastic or elastomeric foamed tube member 21 as the substrate with a thin layer or film 22 forming the outer peripheral surface of tube 21. Layer or film 22 peripherally surrounds tube 21, in secure, bonded, affixed interengagement therewith.

As discussed above, surface coated member 20 may comprise any size or shape, without departing from the scope of the present invention. Furthermore, member 20 may comprise any desired composition which is capable of being peripherally surrounded and intimately bonded or affixed to the protecting film or surface layer. For exemplary purposes only, and not in any way intending to be limited thereby, FIG. 1 and the following disclosure details member 20 in the form of elongated, hollow tube 21 formed from a thermoplastic polymer, an elastomeric polymer, a copolymer or a mixture thereof, with said composition being constructed by foaming. Although a foamed thermoplastic or elastomeric hollow tube is one of the principal configurations for the present invention, it is to be understood that other configurations and compositions can employ the teaching of the present invention, without departing from the scope of this invention.

As depicted in FIG. 1, surface coated member 20 comprises elongated, continuous, hollow thermoplastic or elastomeric foam tube 21 which is peripherally surrounded and intimately bonded in secure, affixed, intimate engagement with thin film or layer 22 and incorporates a central hollow zone 24. In addition, surface coated member 20 also incorporates a longitudinally extending slit 23 which extends from film layer 22 through the entire thickness of thermoplastic foam tube 21, forming an entry way into the longitudinally extending hollow central zone 24 of thermoplastic foam tube 21.

By achieving a surface coated member 20 with thin film layer 22 peripherally surrounding and fully enveloping foam tube 21, while also being securely affixed in intimate bonded interengagement therewith, a product is achieved which is capable of overcoming all of the prior art drawbacks and difficulties. By establishing surface coated tube-shaped member 20, member 20 is easily mounted in any desired location for any desired application, such as swing sets, gym equipment, play yard equipment, etc., wherein peripherally surrounding and protecting the hard surface components thereof is sought. By employing surface coated tube-shaped member 20, the particular hard surface components are covered with a soft, cushioning layer, while also possessing an outer surface which is capable of resisting and withstanding exposure to dirt, inks, grease, etc.

In addition, outer protecting film or layer 22 also imparts abrasion resistance to surface coated tube member 20, thereby enabling member 20 to withstand repeated abrasion and abutting contact without incurring degradation of thermoplastic foam tube layer 21. As a result, the present invention is capable of virtually eliminating all of the drawbacks and difficulties found with the prior art systems.

In the preferred embodiment, thermoplastic foam tube member 21 is formed from a thermoplastic polymer, elastomeric polymer, copolymer, or a mixture thereof. In general, it has been found that such products are preferably formed from polyethylene and are constructed with the final polyethylene foam having a density ranging between about 1 kg/m$^3$ and 500 kg/m$^3$. If desired, any natural or synthetic rubber or mixtures of a natural or synthetic rubber with thermoplastic polymers can also be employed with equal efficacy, without departing from the scope of the present invention.

In forming elongated, thermoplastic foam tube 21, the desired composition is mixed and is then chemically or physically blown, using conventional processes, to form the desired shape in the precisely desired size and configuration. In achieving this result, the cells can be either open or closed cells, with the substrate being formed in any desired hardness or softness. Furthermore, although FIG. 1 depicts thermoplastic foam tube member 21 in a hollow configuration, the tube member can be either hollow or solid, depending upon the end use desired.

In order to provide the desired peripherally surrounding, protective, intimate bonded interengagement of the film with the substrate, the film employed must be compatible with the material employed for the substrate. In addition, the film must comprise a heat shrinkable film which melts or shrinks at a temperature lower than the melting temperature of the substrate. In this way, assurance is provided that the film will shrink and become intimately bonded to the substrate.

Typically, the outer surface of the substrate reaches a temperature to cause softening or melting along with the film. In this way, the desired intimate bonding interengagement is attained. By employing various copolymers or mixtures thereof, the precisely desired shrinking and melting characteristics can be realized.

Depending upon the end use of the product and the visual attributes desired for that product, the film may be formed from material which is clear, opaque, colored, metallized, etc. In addition, other physical characteristics can be incorporated into the film, such as flame retardancy, UV stabilization, antistatic ability, and FDA compliance, as well as visual enhancements such as printed features or embossed patterns.

Film or layer 22, which is constructed to peripherally surround and be intimately bonded to thermoplastic foam tube 21, preferably comprises a tubular shape and ranges in thickness from between about 0.0005 inches to about 0.040 inches. In addition, film or layer 22 is preferably formed from a material which is heat shrinkable in a direction generally perpendicular to the central axis defining its tubular shape.

Other physical characteristics which have been found for establishing an effective, intimately bondable film or layer 22 for foam tube 21 includes the melting temperature for the tubular shaped film as well as the rate of shrinkage attainable. In general, it has been found that an effective tubular shaped film for bonding to a thermoplastic foam tube member should have a melt temperature ranging between about 200° C. and 400° C., while also having a shrink rate ranging between about 1% and 5% of its diameter. In providing a film or layer 22 for bonded securement to polyethylene foam tube member 21, a melting temperature ranging between about 290° C. to 300° C. is preferred, with a shrink rate ranging between about 2% and 4%, preferably 3%. In this regard, it has been found that tubular films formed from ethylene vinyl acetate are particularly effective in providing the precisely desired physical characteristics.

Figure 2:
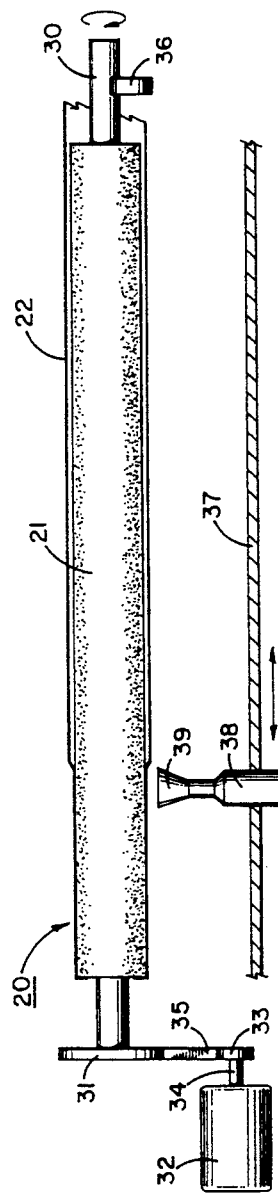

By referring to FIGS. 2 through 5, along with the following detailed disclosure, the alternate embodiments for forming elongated, surface coated tube member 20 of the present invention can best be understood. In FIG. 2, surface coated tube member 20 is depicted in the process of being formed using one embodiment of the preferred forming equipment of the present invention.

In this embodiment, elongated, thermoplastic foam tube 21 is mounted on an elongated support shaft 30 which comprises a diameter substantially equivalent to the diameter of elongated central aperture 24. In this way, frictional engagement between thermoplastic foam tube 21 with shaft 30 is attained, enabling thermoplastic foam tube 21 to be rotated by the rotation of shaft 30.

As shown in FIG. 2, shaft 30 incorporates a drive wheel 31 affixed at one end thereof, with drive motor 32 positioned adjacent drive wheel 31, for providing controlled rotational driving engagement thereof. As is well known in this art, wheel 31 may be rotationally driven in a plurality of ways. For exemplary purposes, drive wheel 31 is depicted as being rotationally driven by motor 32 using drive belt 35. As depicted, motor 32 comprises a shaft 34 with a small drive wheel 33 mounted to the distal end of shaft 34. When motor 32 is actuated, drive wheel 33 and shaft 34 are continuously rotated. By mounting drive belt 35 between drive wheel 33 of motor 32 and drive wheel 31 of shaft 30, the activation of motor 32 causes shaft 30 to be continuously rotated as desired. In addition, the opposed end of shaft 30 is supported by support means 36, which enables shaft 30 to be retained in the desired position, while also being able to rotate freely.

In employing the process of the present invention, thermoplastic foam tube 21 is mounted to shaft 30 with heat shrinkable film 22 placed in peripheral surrounding, enveloping relationship with tube 21. Once in the desired position, motor 32 is activated, causing shaft 30, tube 21, and film 22 to rotate. Then, heating gun or hot air delivery member 38 is activated with outlet portal 39 thereof positioned in juxtaposed, spaced relationship with film 22 and thermoplastic foam tube 21.

In the preferred embodiment, heating gun or hot air delivery member 38 is mounted on movement control means 37, which is constructed for automatically moving hot air delivery member 38 from one end of elongated tube 21 to the opposed end thereof. In order to attain the desired secure bonded affixation of film 22 to thermoplastic tube 21, hot air delivery member 38 preferably comprises an accurate temperature control system capable of maintaining the temperature of the heated air exiting portal 39 at the precisely desired level.

Hot air delivery member 38 comprises a generally conventional construction, which draws ambient air through a chamber wherein heating coils are positioned for elevating the temperature of the air. Fan means are also incorporated in member 38 to draw the air through the heating element, raise the temperature of the air to the desired temperature level and deliver the hot air through outlet portal 39 at the desired temperature.

Outlet portal 39 may comprise any desired shape for controlling the flow of the hot air onto film 22 and tube 21. In the preferred construction, outlet portal 39 comprises an elongated oval shape, having an overall length ranging between about 1 and 4 inches and a width ranging between about 0.12 inches and 0.5 inches. In this way, delivery of the heated air to the precisely desired position in a limited controlled zone is provided.

In FIG. 2, hot air delivery member 38 is depicted partially advanced along the length of surface coated tube member 20 with a portion of film 22 securely, intimately bonded to the outer surface of foam tube 21. In this process, hot air delivery member 38 continues to advance longitudinally along the length of tubular shaped film 22 and elongated thermoplastic tube 21, while film 22 and tube 21 are continuously rotated. As a result, the hot air exiting from outlet portal 39 is delivered directly to heat shrinkable, tube shaped film 22, causing film 22 to be reduced in diameter. In addition, the hot air also raises the temperature of the outer surface of tube 21, causing film 22 and tube 21 to become affixed in secure bonded engagement with each other.

By matching the rotational speed of tube 21 and film 22 with the longitudinal movement of hot air delivery member 38, the precisely desired film shrinkage is attained and film 22 is brought into secure, abutting, bonded interengagement with tube 21. In general, it has been found that film 22 and foam tube 21 should be rotated at a speed ranging between about 60 and 100 RPM, while hot air delivery member 38 is longitudinally advanced at a rate of between about 12 inches and 20 inches per minute.

In the foregoing disclosure, the preferred operating ranges for the process of this invention have been provided. However, it is to be understood that the optimum operating conditions can be widely varied, depending principally upon the thickness of the film, the diameter of the film, and the diameter of the foam tube. Consequently, variations may be made in these ranges without departing from the scope of this invention.

It has also been found that the force of the hot air impinging upon film 22 assists in pushing film 22 into interengagement with tube 21 as the melting temperature of film 22 is reached and film 22 shrinks into bonded securement to tube 21. Furthermore, the hot air from member 38, along with the residual heat retained by film 22, causes the surface of tube 21 to be elevated, further assisting in the bonded secure interengagement of film 22 and foam tube 21.

As hot air delivery member 38 continues to advance along the length of foam tube 21 and film 22, the desired secure, bonded affixation of film 22 to foam tube 21 is obtained. In addition, by applying film 22 to foam tube 21 in the manner detailed above, it has been found that any gas escaping from tube 21, due to the elevated temperatures thereof, or trapped between film 22 and tube 21, is driven out by the force of the hot air impinging upon film 22 and tube 21. As a result, all of the escaping gas is forced through the open zone between film 22 and tube 21, providing a secure, intimately bonded contacted engagement between film 22 and foam tube 21. In this way, mechanically sound, bonded affixation is realized.

Figure 3:
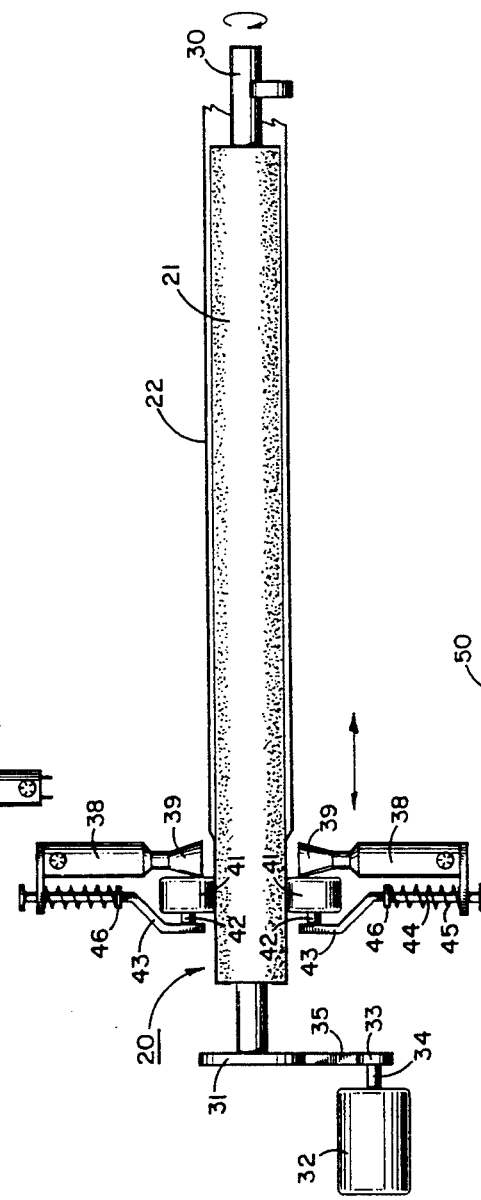

In FIG. 3, an alternate embodiment for securely affixing film 22 to foam tube 21 is detailed. In this embodiment, foam tube 21 with tubular shaped film 22 is mounted to rotatable shaft 30, which is driven in the identical manner detailed above in reference to FIG. 2. In this embodiment, however, two separate and independent high pressure heat guns or hot air delivery members 38 are employed, with members 38,38 being mounted on opposed sides of foam tube 21, in juxtaposed, spaced, relationship along a diameter of tube 21. In addition, each member 38 is mounted for simultaneous movement along the length of foam tube 21, in a manner similar to the controlled, automatic advanced movement detailed above in reference to FIG. 2. As a result, for purposes of simplicity, the drive system is not depicted in FIG. 3.

In addition to incorporating two separate and independent high pressure heat guns or hot air delivery members 38,38, this embodiment also incorporates pressure means for forcing film 22 into bonded interengagement with foam tube 21. In FIG. 3, one embodiment for providing this mechanical pressure is depicted, with each hot air delivery member 38 comprising a pressure roller assembly, so that balanced heating and mechanical pressure is simultaneously applied on opposite sides of foam tube 21.

In this embodiment, the pressure roller assembly comprises pressure roller 41, rotationally mounted to shaft 42, with shaft 42 securely affixed to elongated arm 43. In addition, arm 43 is movably mounted to support shaft 44 about which spring means 45 is positioned. By securing spring means 45 about shaft 44 under compression, with one end of spring means 45 in contact with holding plate 46 of support arm 43, spring means 45 provides a continuous biasing force on roller 41, maintaining roller 41 in contact with film 22 and tube 21. By controlling the force provided by spring means 45, roller 41 is maintained in contact with film 22 and foam tube 21 with the precisely desired amount of mechanical pressure.

As is apparent from the foregoing detailed disclosure, the embodiment depicted in FIG. 3 operates in a substantially identical manner to the embodiment detailed in FIG. 2 and fully discussed above. The only difference between these two embodiments is the presence of two hot air delivery members 38,38 and two compression rollers assemblies. By employing compression rollers 41,41 and the assembly associated therewith on both sides of elongated surface coated tube member 20, enhanced, secure, intimate bonded engagement of film 22 with foam tube 21 is obtained.

It has been found that by employing pressure rollers 41,41, film 22 is intimately bonded to the entire surface of foam tube 21, as opposed to the top crown or top edges of the cells of foam tube 21. In addition, by providing mechanical compression during the formation process, any and all unwanted trapped air or gas is forced out before secure bonded affixation of film 22 to tube 21 is completed. As a result, film layer 21 is more intimately securely bonded to foam tube 21, and a high quality surface coated tube member 20 is attained.

Figure 4:
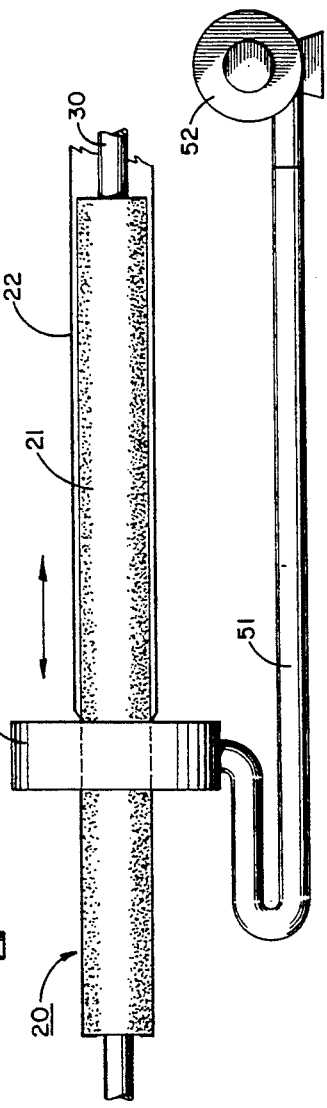

In FIG. 4, a further alternate embodiment for securing affixing film 22 to foam tube 21 is depicted. In this embodiment, foam tube 21 is mounted to a support shaft 30, in the manner generally detailed above. However, in this embodiment, shaft 30 is not rotationally driven and may comprise a stationary tube holding support shaft.

In order to eliminate the need for rotational movement of foam tube 21, hot air distribution member 50 is constructed to peripherally surround foam tube 21 and film layer 22. Although alternate configurations can be employed, in the preferred embodiment, hot air distribution member 50 comprises a generally toroidal or doughnut shape. In addition, air delivering tube means 51 are employed with one end of tube means 51 mounted to toroidal shaped member 50, with the opposed end of tube means 51 mounted to a high pressure blower 52. In this way, when blower 52 has been activated, air is continuously delivered under high pressure through tube means 51 to member 50.

In order to provide the required heat for raising and maintaining the temperature of the flowing air at the desired level, heating elements (not shown) are mounted in either tube 51 or distribution member 50. In operation, blower 52 is activated causing air to flow through tube 51 and member 50 at an elevated pressure. With the heating elements on, the temperature of the air is raised to the desired level, with the heated air being forced directly onto film 22 and foam tube 21.

By forming a plurality of exit portals in the inside surface of member 50, hot air is simultaneously delivered to the entire outer peripheral surface of film 22 and foam tube 21. In this way, member 50 simultaneously elevates the entire outer surface of film 22 and tube 21 in the area in which member 50 is positioned. In addition, the pressure of the air flow causes film 22 to be forced into intimate engagement with foam tube 21, thereby driving out any escaping gas and assuring secure bonded engagement of film 22 to tube 21.

By advancing member 50 longitudinally along the length of elongated foam tube 21, the desired secure bonded affixation of film 22 to tube 21 is attained. As is apparent from the preceding description, although not depicted in FIG. 4, member 50 is constructed in a generally conventional manner to controllably move at a predefined speed from one end of elongated foam tube 21 to the opposed end thereof.

Figure 5:
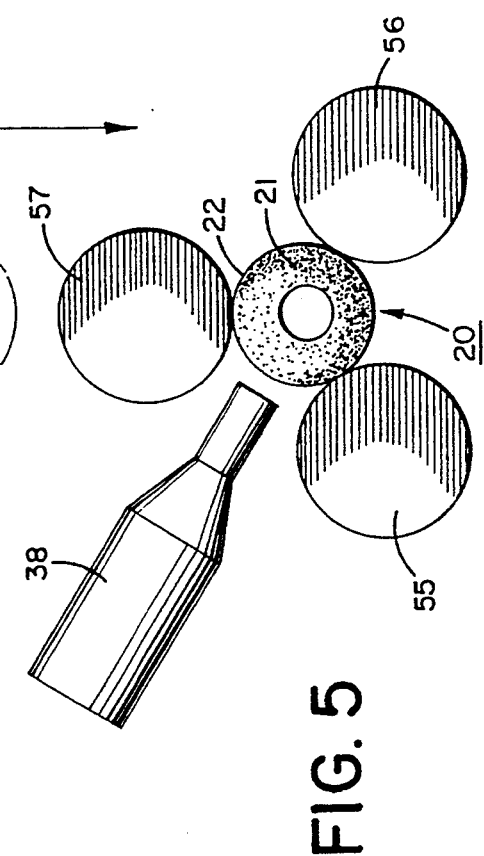

In FIG. 5, a further alternate embodiment for manufacturing the surface coated tube member of the present invention is fully depicted. In this embodiment, two stationary rollers 55 and 56 are employed along with a movable roller 57. All of the rollers 55, 56, and 57 are mounted for rotational movement about their central axis, once activated. In addition, rollers 55, 56, and 57 are constructed to rotate about a central axis which is substantially parallel to each other, as well as being parallel to the central axis of tube 21, when mounted in position therewith.

In the preferred embodiment, at least a second set of roller assemblies 55, 56 and 57 is positioned at the opposed end of elongated foam tube 21 to provide secure support therefor. If desired, additional roller assemblies may be placed along the length of tube 21 in order to provide further support, as well as assure the rotational movement thereof. Regardless of the number of additional roller assemblies employed, each is mounted in alignment with each other to provide the desired support and rotational operation.

In this embodiment, a high pressure heat gun or hot air delivery member 38, as detailed above, is also employed. High pressure heat gun or hot air delivery member 38 is positioned with its outlet portal in juxtaposed spaced relationship with film 22 and foam tube 21, by positioning member 38 between two adjacent rollers.

In employing this embodiment, movable roller 57 is moved to its open position, depicted in phantom in FIG. 5. Then, elongated foam tube 21, with tubular shaped film layer 22 positioned thereabout, is placed in contact with rollers 55 and 56.

Once elongated foam tube 21, with its peripherally surrounding film layer 22 are positioned in the desired location in contact with rollers 55 and 56, roller 57 is moved into abutting contact with film 22 in tube 21. When desired, rollers 55, 56 and 57 are activated to rotate in the pre-set direction, causing foam tube 21 and film 22 to be rotationally driven therewith. With film 22 and foam tube 21 rotationally moved at the desired speed, high pressure heat gun or hot air delivery member 38 is activated to deliver the precisely desired heat shrinking pressured air to film 22 and foam tube 21. In this way, the shrinking of film 22 into secure bonded affixation with foam tube 21 is achieved.

Using movement control means as detailed above, high pressure heat gun or hot air delivery member 38 is advanced at the desired speed along the length of foam tube 21, causing film 22 to be continuously melted into secure bonded affixed interengagement with foam tube 21. By employing a high pressure heat gun or member 38, the pressure caused by the flowing hot air contacting film 22 forces film 22 into engagement with tube 21, thereby assuring the secure bonded affixation of film 22 to foam tube 21. However, if desired, mechanical rollers, as shown in FIG. 3, may also be employed to further enhance the bonded affixation of film 22 to foamed tube 21.

Although the foregoing embodiments have been depicted for manufacturing a single, elongated, surface coated tube member 20, each of these embodiments may be constructed in a manner which will simultaneously manufacture a plurality of surface coated members 20. In order to achieve simultaneous manufacture of a plurality of tube members 20, a plurality of shafts would be employed with each shaft mounted at its terminating ends to a shared drive wheel.

Using well known technology, each of the shafts are independently driven by a single drive motor, and a single travel control member is constructed with a plurality of high pressure heat guns or hot air delivery members mounted thereto. In this construction, the plurality of tube supporting shafts define an enlarged circular-shaped array, with the hot air delivery members centrally positioned in the circular array, with the outlets thereof directly adjacent one of the tube members mounted to one of the shafts. In this way, any number of surface coated tube members can be simultaneously formed depending upon the size of the equipment employed and the number of shafts capable of being accommodated in the particular area.

In order to prove the efficacy of the present invention, a plurality of sample surface coated tube members 20 were constructed using the forming equipment shown in FIG. 2 and fully detailed above. In conducting these tests, an elongated, cylindrical, hollow polyethylene foam tube member was employed having a diameter of 4 inches. In each of these tests, the tubular shaped elongated film layer was formed from ethylene vinyl acetate and had thicknesses ranging between about 0.0015 and 0.005 inches.

In each of these tests, the hot air delivery member was set to maintain the temperature of the heated air at between about 290° C. and 300° C., with the outlet portal of the delivery member being spaced away from the surface of the film layer and elongated foam tube by a distance ranging between about 1.1 and 1.25 inches. In addition, the outlet portal was formed in an elongated oval shape having a length of 3 inches and a width of about one-quarter of an inch. Finally, the movement control means for advancing the hot air delivery, member along the length the elongated foam tube was set to move the delivery member at a rate of 16 inches per minute.

Using these operating conditions, a plurality of surface coated tube members were formed. In each instance, the film layer was intimately bonded to the outer surface of the foam tube with no visible air pockets being detected. Furthermore, in order to prove the secure, intimate, affixed, bonded engagement of the film layer to the surface of the foam tube, tests were conducted to peel the film layer from the tube surface. In each instance, portions of the foam tube member were torn away along with the film layer, thereby proving the intimate bonded interengagement of film layer with the foam tube member. Furthermore, using 2 inch wide sections of the surface coated tube member, the tests conducted resulted in the average peel resistance or force required to remove the film from the surface of the foam tube to be four pounds.

It will thus be seen that the objects set forth above, among those made apparent from the preceding description are efficiently attained and, since certain changes may be made in the above article as well as in carrying out the above process and the constructions set forth, without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:

1. A system for manufacturing an integrally bonded, surface coated, cushioning member constructed for mounting to an otherwise hard-surfaced product wherein said surface coated cushioning member comprises a substrate having a desired overall configuration formed from one or more compounds selected from the group consisting of thermoplastic polymers, elastomeric polymers, copolymers, natural rubbers, and synthetic rubbers and further comprises an elongated, hollow, substantially cylindrically shaped configuration which is formed by foaming, providing a soft, compressible substrate capable of imparting the desired cushioning effect to the hard-surfaced product upon which it is mounted, and said surface coating comprises a thin film layer formed from heat shrinkable material which loosely peripherally surrounds the outer surface of said substrate, said system comprising A. support means for securely retaining the substrate and the thin film layer and comprising at least one roller assembly incorporating three roller members, each mounted for rotational movement about an axis, with each of said axes being parallel to each other and substantially parallel to the central axis of the cylindrically shaped substrate, thereby continuously rotating the substrate at a preset, desired rate of speed; and B. at least one hot air delivery member positioned directly adjacent one end of the substrate and film layer for delivering a continuous flow of heated air thereto and mounted for being automatically advanced along the length of the substrate at a predetermined rate of speed for heating a portion of the film layer to its melting point and causing said film layer to shrink into bonded affixation with the outer surface of the substrate while continuously advancing along the entire length of the film coated substrate for automatically intimately bonding the entire film layer to the surface of the substrate.

2. A system for manufacturing an integrally bonded surface coated cushioning member constructed for mounting to an otherwise hard-surfaced product wherein said surface coated cushioning member comprises a substrate having a desired overall configuration formed from one or more compounds selected from the group consisting of thermoplastic polymers, elastomeric polymers, copolymers, natural rubbers, and synthetic rubbers and further comprises an elongated, hollow, substantially cylindrically shaped configuration which is formed by foaming, providing a soft, compressible substrate capable of imparting the desired cushioning effect to the hard-surfaced product upon which it is mounted, and said surface coating comprises a thin film layer formed from heat shrinkable material which loosely peripherally surrounds the outer surface of said substrate, said system comprising A. support means for securely retaining the substrate and the thin film layer and comprising an elongated shaft about which the cylindrically shaped substrate is mounted, with said support means being constructed for continuously rotating about the central axis thereof, causing the substrate and film layer to continuously rotate therewith;

B. at least one hot air delivery member positioned directly adjacent one end of the substrate and film layer for delivering a continuous flow of heated air thereto and mounted for being automatically advanced along the length of the substrate at a predetermined rate of speed for heating a portion of the film layer to its melting point and causing said film layer to shrink into bonded affixation with the outer surface of the substrate while continuously advancing along the entire length of the film coated substrate for automatically intimately bonding the entire film layer to the surface of the substrate; and C. a roller assembly mounted adjacent the hot air delivery member and constructed for being maintained in adjustable contacting relationship with the film layer and substrate for forcing the film layer into contacting engagement with the outer surface of the substrate, thereby further enhancing the secure, affixed, bonded interengagement of the film layer with the substrate.

3. The system for manufacturing an integrally bonded surface coated cushioning member defined in claim 2, wherein said system is further defined as comprising two separate and independent heater assemblies positioned on opposed sides of the elongated, cylindrically shaped substrate in juxtaposed spaced relationship with opposed portions thereof and two separate and independent roller assemblies, each mounted adjacent one of the heater assemblies for providing substantially equivalent opposing forces along the same diameter of the substrate for enhancing the forced engagement of the film layer to the substrate.

* * * * *